(12) United States Patent
Rike

(10) Patent No.: US 12,411,029 B1
(45) Date of Patent: Sep. 9, 2025

(54) SYSTEMS AND METHODS FOR TANK INSPECTION

(71) Applicant: Thomas Wayne Rike, College Station, TX (US)

(72) Inventor: Thomas Wayne Rike, College Station, TX (US)

( * ) Notice: Subject to any disclaimer, the term of this patent is extended or adjusted under 35 U.S.C. 154(b) by 0 days.

(21) Appl. No.: 19/178,859

(22) Filed: Apr. 14, 2025

Related U.S. Application Data

(60) Provisional application No. 63/633,849, filed on Apr. 14, 2024.

(51) Int. Cl.
*G01D 11/30* (2006.01)

(52) U.S. Cl.
CPC .................... *G01D 11/30* (2013.01)

(58) Field of Classification Search
CPC ..................................... G01D 11/30
See application file for complete search history.

(56) References Cited

U.S. PATENT DOCUMENTS

| | | | |
|---|---|---|---|
| 4,673,819 A | 6/1987 | Rose | |
| 4,715,966 A | 12/1987 | Bowman | |
| 5,698,775 A | 12/1997 | Philip et al. | |
| 6,263,747 B1 | 7/2001 | Carson et al. | |
| 6,274,033 B1 | 8/2001 | Hudgin | |
| 6,619,118 B1 | 9/2003 | Keck | |
| 6,879,935 B2 | 4/2005 | Keck | |
| 6,883,246 B1 | 4/2005 | Latham | |
| 7,322,252 B1 | 1/2008 | Rodgers | |
| 7,836,760 B2 | 11/2010 | Saylor | |
| 9,786,152 B1 * | 10/2017 | Walker | G01F 23/0038 |
| 10,584,474 B2 | 3/2020 | Grantham | |
| 10,788,455 B2 | 9/2020 | Smith et al. | |
| 2005/0005467 A1 | 1/2005 | Hannel | |
| 2006/0151362 A1 | 7/2006 | Grotenrath | |

(Continued)

FOREIGN PATENT DOCUMENTS

| | | |
|---|---|---|
| CN | 113654617 A | 11/2021 |
| DE | 19639250 A1 | 1/1998 |

(Continued)

OTHER PUBLICATIONS

Vividia TVS-100 Telescopic Wireless Inspection Camera 1 Meter Long for iPhone iPad Android Devices, www.oasisscientific.com, Sep. 18, 2020.

(Continued)

*Primary Examiner* — Jamel E Williams
(74) *Attorney, Agent, or Firm* — Mackey Law Firm PLLC

(57) ABSTRACT

A system for inspecting an underground tank can include a first pole having a first end for being disposed through an access port of the tank and a second end longitudinally opposite the first end, a second pole having a first end and a second end longitudinally opposite the first end, and a coupler for selectively coupling the first pole and the second pole to one another in at least one position. The second pole can span the access port of the tank. The first end of the first pole can lift a sensor disposed within the tank to an elevated position. The first pole, the second pole and the coupler can hold the sensor in the elevated position. The tank can be a septic tank. The sensor can be a pump sensor in a septic tank.

20 Claims, 4 Drawing Sheets

(56) References Cited

U.S. PATENT DOCUMENTS

| | | | | |
|---|---|---|---|---|
| 2007/0186648 A1* | 8/2007 | Harmon | ............... | G01F 23/68 |
| | | | | 73/319 |
| 2010/0078367 A1 | 4/2010 | Orom et al. | | |
| 2016/0215910 A1* | 7/2016 | Hrncir | ............... | G01D 11/30 |

FOREIGN PATENT DOCUMENTS

| | | |
|---|---|---|
| JP | 2001079575 A | 3/2001 |
| KR | 20240071878 A | 5/2024 |

OTHER PUBLICATIONS

Grabber Pole, www.nabcosystems.com, Oct. 31, 2020.
Truck Cargo Grabber, 6Ft Truck Cargo Retriever Telescoping Pole with Two Hooks, Truck Grabber Reach Tool for Pickup Truck Bed Heavy Duty Truck Accessories, www.amazon.com (Accessed: Jun. 16, 2024).
Fiberglass Poles with Quick-Connect Ends, southlandtool.com, Apr. 5, 2014.
Volmees 43" Extra Long Grabber Tool, Grabbers for Elderly Grab it Reaching Tool, with Adjustable Rope, 4" Wide Claw Reacher Trash Grabber Pickup Tool 360 Degrees, Rotating Jaw + Magnets, Heavy Duty Foldable Grabber, www.amazon.com (Accessed: Jun. 16, 2024).
Prototek Corp., Prototek Mirror on a Stick Kit Septic Tank Inspection Accessory, https://www.amazon.com/Prototek-Mirror-Septic-Inspection-Accessory/dp/B07S41D2NK (Accessed: Dec. 6, 2023).

* cited by examiner

SYSTEMS AND METHODS FOR TANK INSPECTION

CROSS REFERENCE TO RELATED APPLICATIONS

This application claims the benefit of U.S. Provisional Patent Application No. 63/633,849 filed Apr. 14, 2024, the entire contents of which are incorporated herein by reference.

TECHNICAL FIELD

The present disclosure relates generally to underground tanks, and more specifically relates to inspection of underground tanks.

BACKGROUND

Inspecting septic tanks, such as those with aerobic systems, can be labor intensive. These systems typically need to be inspected regularly. Septic system tanks with internal pumps often have remotely located irrigation heads. This typically requires one inspector to manipulate the pump controls and/or other equipment at the tank, and another inspector to inspect equipment located remotely from the tanks, such as for determining whether the remote irrigation heads are functioning properly.

SUMMARY

Applicant has created new and useful devices, systems and methods for tank inspection. Embodiments of the disclosure can advantageously provide for more efficient and less labor intensive tank inspections. In at least one embodiment, a system according to the disclosure can include a first pole having a first end for being disposed through an access port of a tank and a second end longitudinally opposite the first end, a second pole having a first end and a second end longitudinally opposite the first end, a coupler for selectively coupling the first pole and the second pole to one another one or more positions, or any combination thereof. In at least one embodiment, the second pole can span an access port of the tank, the first end of the first pole can lift a sensor disposed within the tank to an elevated position, the first pole, the second pole and the coupler can selectively and/or independently hold the sensor in the elevated position, or any combination thereof. In at least one embodiment, the tank can be a septic tank. In at least one embodiment, the sensor can be a pump sensor in a septic tank.

In at least one embodiment, the first pole can be longer than the second pole. In at least one embodiment, the first pole can be suspended from the second pole. In at least one embodiment, the first end of the first pole can selectively couple with a sensor disposed within the tank. In at least one embodiment, the first end of the first pole can include a hook.

In at least one embodiment, the coupler can selectively couple the first pole and the second pole to one another in a first position wherein the first and second poles cross one another. In at least one embodiment, the coupler can selectively couple the first pole and the second pole to one another in a first position wherein the first and second poles are perpendicular to one another. In at least one embodiment, the coupler can selectively couple the first pole and the second pole to one another in a second position wherein the first and second poles do not cross one another. In at least one embodiment, the coupler can selectively couple the first pole and the second pole to one another in a second position wherein the first and second poles are parallel to one another.

In at least one embodiment, the second pole can span the access port of the tank. In at least one embodiment, the first end of the first pole can be disposed within the tank when the first pole and the second pole are coupled to one another in the at least one position. In at least one embodiment, the first end of the first pole can support a sensor disposed within the tank when the first pole and the second pole are coupled to one another in the at least one position. In at least one embodiment, the second pole and the coupler can support the first end of the first pole at a plurality of different locations within the tank. In at least one embodiment, the second pole and the coupler can selectively suspend the first end of the first pole at a plurality of different locations within the tank.

In at least one embodiment, the coupler can selectively couple the second pole to the first pole at a plurality of different locations along a length of the first pole. In at least one embodiment, the coupler can be slideably coupled to the first pole and/or can be selectively fixed at a plurality of different locations along a length of the first pole. In at least one embodiment, the first and second poles can be rotateably coupled to one another. In at least one embodiment, the coupler can selectively rotateably secure one of the first and second poles in one or more positions relative to the other of the first and second poles. In at least one embodiment, the coupler can selectively couple with at least one of the first and second poles by snap fit.

In at least one embodiment, the coupler can be slideably coupled to the first pole and/or can be selectively fixed at a plurality of different locations along a length of the first pole. In at least one embodiment, the coupler can be slideably coupled to the second pole and configured to be selectively fixed at a plurality of different locations along a length of the second pole. In at least one embodiment, the first and second poles can be rotateably coupled to one another. In at least one embodiment, the coupler can include a first portion coupled to the first pole and a second portion coupled to the second pole. In at least one embodiment, the first and second portions of the coupler are rotateably coupled to one another.

In at least one embodiment, a method of inspecting a septic system having an underground tank with an access port can include accessing an interior of the tank through the access port, lifting a sensor within the tank to an elevated position with a first pole, spanning the access port with a second pole, suspending the first pole and the sensor from the second pole, or any combination thereof. In at least one embodiment, a method of inspecting a septic system can include coupling the first and second poles to one another. In at least one embodiment, a method of inspecting a septic system can include holding the sensor in the elevated position with the first pole. In at least one embodiment, a method of inspecting a septic system can include sliding the second pole downwardly along the first pole until the second pole contacts at least one of the access port, a structure surrounding the access port, and a combination thereof. In at least one embodiment, a method of inspecting a septic system can include selectively and/or independently holding the sensor in the elevated position with the first and second poles. In at least one embodiment, a method of inspecting a septic system can include sliding the first pole downwardly relative to the second pole to release the sensor.

In at least one embodiment, the system can include a pump and one or more spray heads. In at least one embodiment, the method can include running the pump and inspecting the one or more spray heads while the first pole and the sensor are suspended from the second pole. In at least one embodiment, the sensor can be a pump sensor. In at least one embodiment, the system can include an alarm sensor disposed within the tank. In at least one embodiment, the method can include lifting the alarm sensor with the first pole. In at least one embodiment, lifting the alarm sensor with the first pole can occur before, during, or after suspending the first pole and the pump sensor from the second pole.

In at least one embodiment, the second pole can be selectively coupled to the first pole in a first position when the first pole and the sensor are suspended from the second pole. In at least one embodiment, the method can include coupling the second pole to the first pole in a second position that differs from the first position. In at least one embodiment, the method can include lifting the sensor and/or one or more other sensors with the first pole while the second pole is coupled to the first pole in the second position.

In at least one embodiment, the method can include independently holding the sensor in the elevated position with the first and second poles. In at least one embodiment, the method can include inspecting a portion of the system located distally from the access port while the sensor is held in the elevated position with the first and second poles. In at least one embodiment, the elevated position can be within the tank. In at least one embodiment, the method can include coupling the first and second poles to one another with a coupler. In at least one embodiment, the method can include coupling the first and second poles to one another in a plurality of different positions with a single coupler.

In at least one embodiment, one or more poles can be or include a one-piece pole, such as by way of being made of a single piece of tubing or other pole material. In at least one embodiment, one or more poles can be or include a multi-piece pole, such as by way of being made up of a plurality of pole portions or sections configured to be coupled to one another, for example, in an end to end configuration. In at least one embodiment, two or more pole portions can be removably coupled to one another, such as via a threaded connection, quarter-turn connection or other removable coupling. In at least one embodiment, one or more poles can be of a fixed length. In at least one embodiment, one or more poles can be of an adjustable length, such as by way of comprising two or more pole portions that telescope relative to one another. In at least one embodiment, one or more poles can have one or more handles or grips, which can be disposed on one or more ends of the pole and/or otherwise disposed along a length of the pole.

In at least one embodiment, one or more poles can have a length greater than a length of one or more other poles. In at least one embodiment, one or more poles can include two or more pole portions arranged to be coupled to one another and having a collective length greater than a length of one or more other poles or pole portions. In at least one embodiment, a first or other pole (such as a reaching pole) can be arranged for being disposed through an access port of a tank, a second or other pole (such as a spanning pole or support pole) can be arranged for being coupled to the reaching pole and spanning the access port of the tank, and the reaching pole can be longer than the spanning pole. In at least one embodiment, the reaching pole can be a multi-piece pole and the spanning pole can be a one-piece pole.

DETAILED DESCRIPTION

Figure 1:
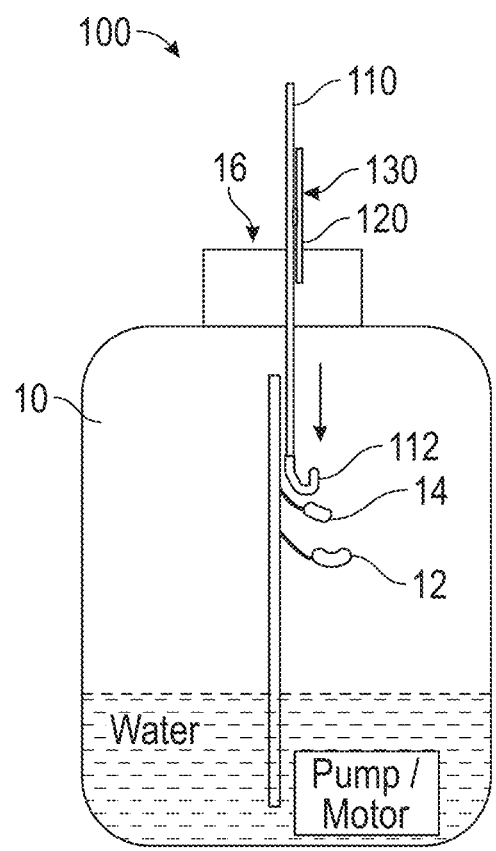
FIG. 1 is a simplified elevation view of one of many embodiments of a system for inspecting an underground tank according to the disclosure.

The figures described above and the written description of specific structures and functions below are not presented to limit the scope of what Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Applicant has created new and useful devices, systems and methods for more efficiently inspecting underground tanks. In at least one aspect, embodiments of the disclosure can advantageously provide for inspections of aerobic septic systems, which would normally require two inspectors or other individuals to perform, to instead be performed by a single person and/or otherwise more efficiently. In at least one embodiment, a system according to the disclosure can be or include a system for inspecting one or more underground tanks, which can include inspecting or otherwise addressing or involving one or more tanks while inspecting a fluid system that includes one or more underground tanks. An underground tank can be disposed partially or wholly underground.

Figure 2:
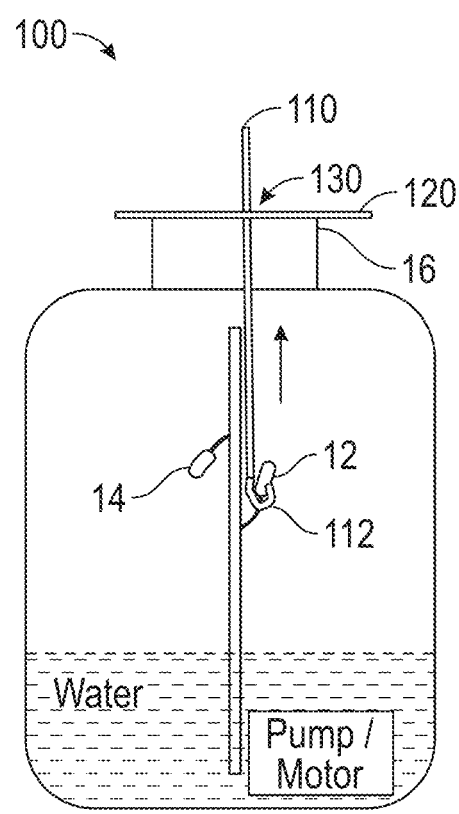
FIG. 2 is another simplified elevation view of one of many embodiments of a system for inspecting an underground tank according to the disclosure.
Figure 3:
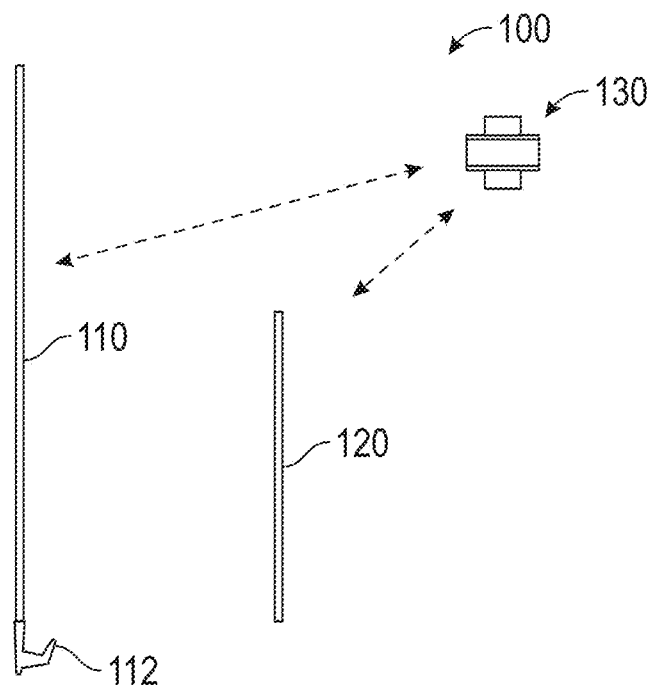
FIG. 3 is an exploded view of one of many embodiments of a system for inspecting an underground tank according to the disclosure.
Figure 4:
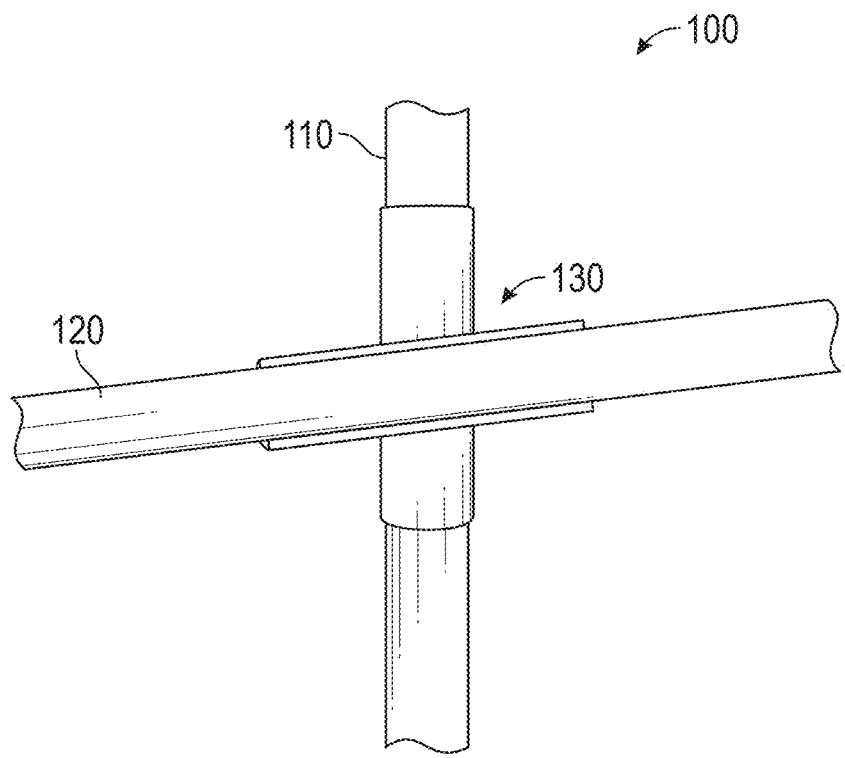
FIG. 4 is a close-up elevation view of a portion of one of many embodiments of a system for inspecting an underground tank according to the disclosure.
Figure 5:
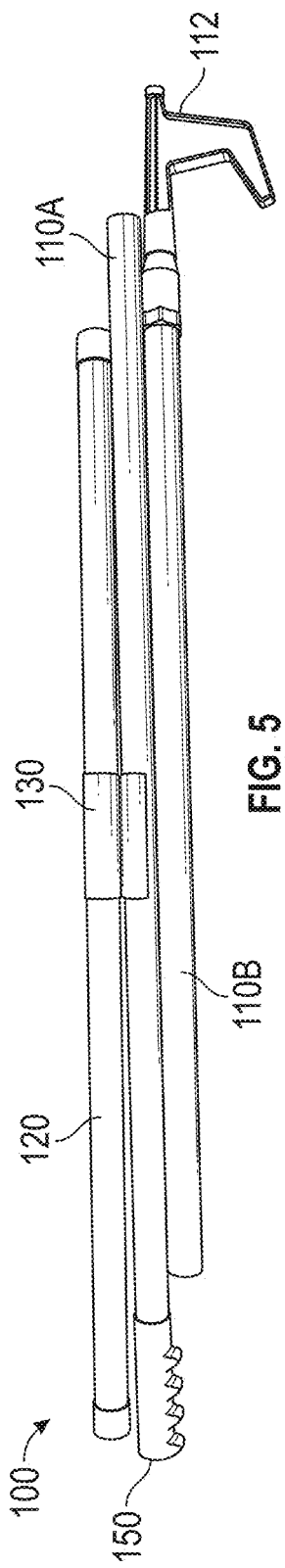
FIG. 5 is a perspective view of one of many embodiments of a system for inspecting an underground tank according to the disclosure, shown in a collapsed configuration.
Figure 6:
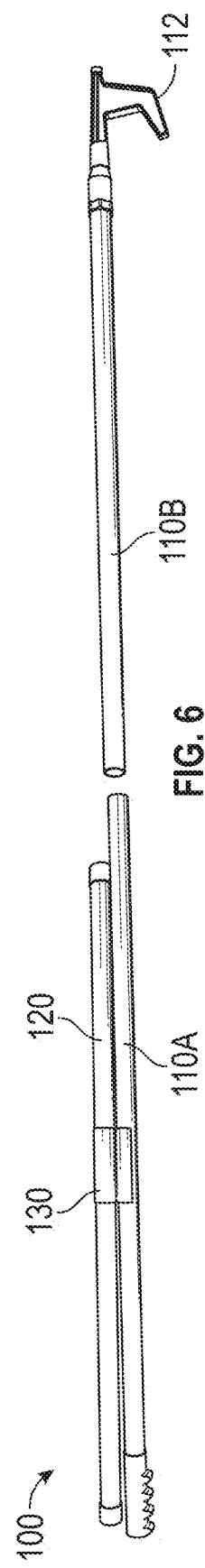
FIG. 6 is a perspective view of a portion of the embodiment of FIG. 5, shown in a partially collapsed configuration.
Figure 7:
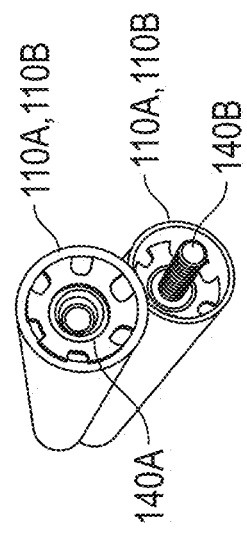
FIG. 7 is a perspective view of one of many embodiments of a coupler for a system for inspecting an underground tank according to the disclosure.
Figure 9:
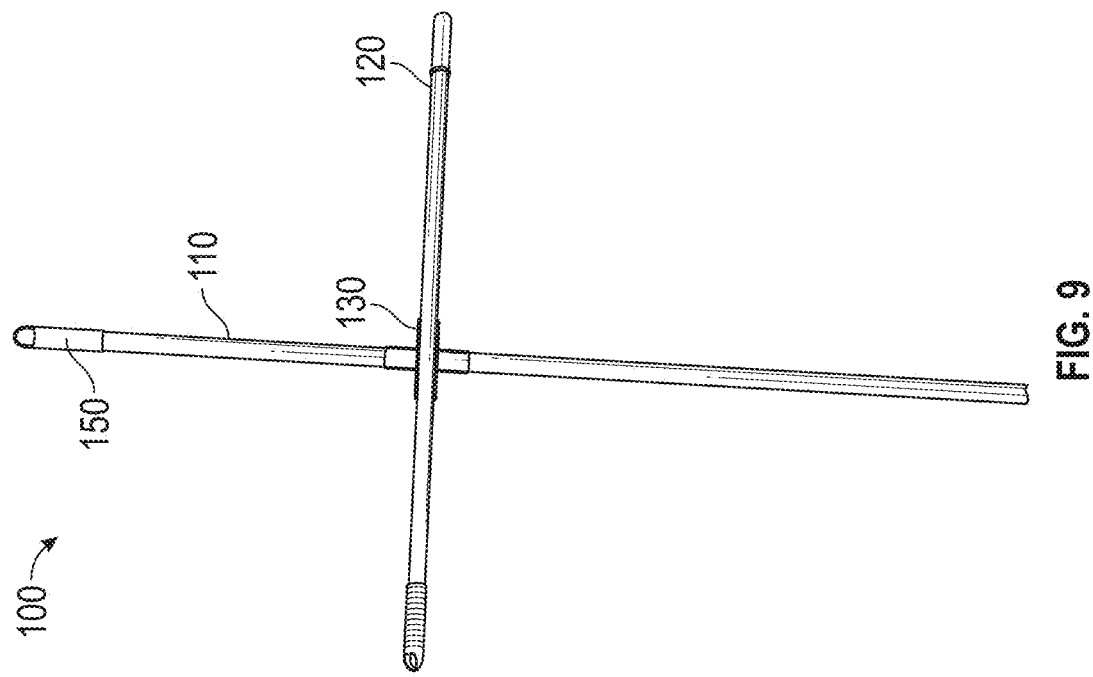
FIG. 9 is an elevation view of one of many embodiments of a system for inspecting an underground tank according to the disclosure, showing first and second poles coupled to one another in another crossed configuration.
Figure 8:
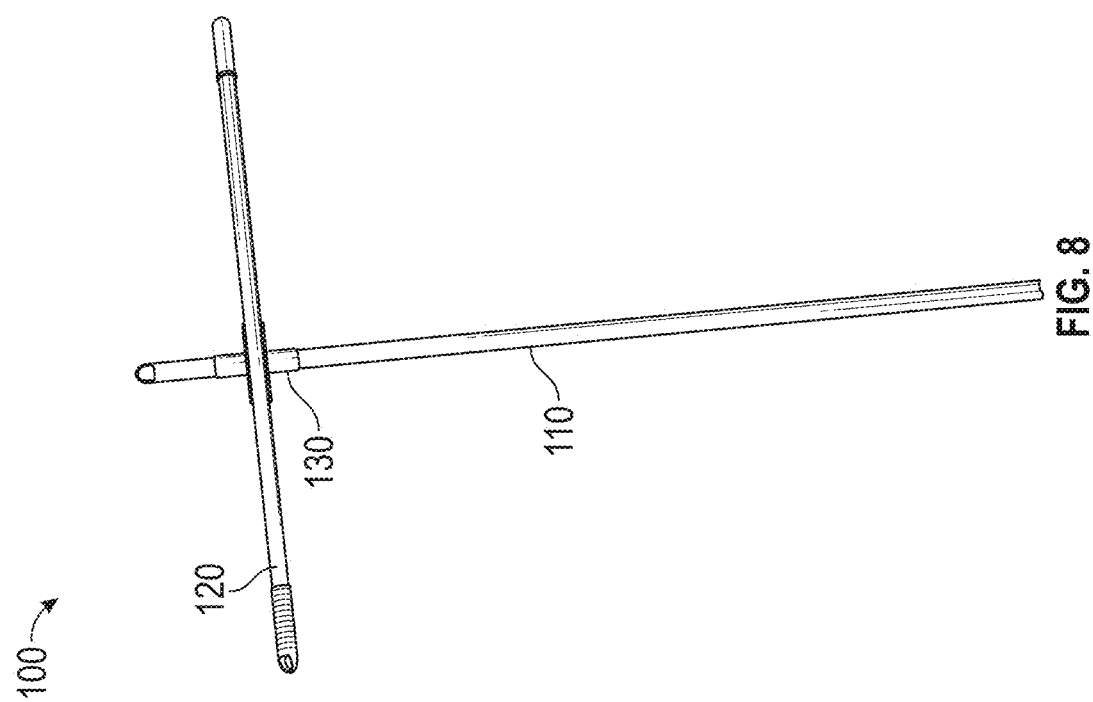
FIG. 8 is an elevation view of one of many embodiments of a system for inspecting an underground tank according to the disclosure, showing first and second poles coupled to one another in a crossed configuration.

FIG. 1 is a simplified elevation view of one of many embodiments of a system for inspecting an underground tank according to the disclosure. FIG. 2 is another simplified elevation view of one of many embodiments of a system for inspecting an underground tank according to the disclosure. FIG. 3 is an exploded view of one of many embodiments of a system for inspecting an underground tank according to the disclosure. FIG. 4 is a close-up elevation view of a portion of one of many embodiments of a system for inspecting an underground tank according to the disclosure. FIG. 5 is a perspective view of one of many embodiments of a system for inspecting an underground tank according to the disclosure, shown in a collapsed configuration. FIG. 6 is a perspective view of a portion of the embodiment of FIG. 5, shown in a partially collapsed configuration. FIG. 7 is a perspective view of one of many embodiments of a coupler for a system for inspecting an underground tank according to the disclosure. FIG. 8 is an elevation view of one of many embodiments of a system for inspecting an underground tank according to the disclosure, showing first and second poles coupled to one another in a crossed configuration. FIG. 9 is an elevation view of one of many embodiments of a system for inspecting an underground tank according to the disclosure, showing first and second poles coupled to one another in another crossed configuration. FIGS. 1-9 are described in conjunction with one another.

In at least one embodiment, a system 100 according to the disclosure can be a system for inspecting one or more underground tanks 10 and/or one or more systems comprising an underground tank 10, such as, for example, an aerobic septic system. In at least one embodiment, system 100 can include one or more first (or other) poles 110 having a first end for being disposed through one or more access ports 16 or other openings into an interior of tank 10 and a second end longitudinally opposite the first end, one or more second (or other) poles 120 having a first end and a second end longitudinally opposite the first end, one or more couplers 130 for selectively coupling first pole 110 and second pole 120 to one another in at least one position, or any combination thereof. As used herein, relational terms such as "first," "second," and the like are merely used as arbitrary identifiers for ease of reference and understanding and are not intended to limit the scope of the disclosure or claims unless otherwise indicated.

In at least one embodiment, second pole 120 can be arranged for spanning access port 16 of tank 10, such as by having a length greater than a dimension of access port 16 and/or surrounding structure, and supporting first pole 110 relative to tank 10. In at least one embodiment, the first end of first pole 110 can be arranged for manipulating equipment disposed within tank 10, such as by way of lifting one or more sensors (such as a pump level sensor 12 and/or an alarm sensor 14) disposed within tank 10 to an elevated position or other position. For example, one or more of sensors 12, 14 can be lifted or otherwise positioned with system 100 in order to simulate one or more conditions, such as a fluid level at or above an operational height or a fluid level higher than a normal operating height. In at least one embodiment, first pole 110, second pole 120 and coupler 130 can be arranged for selectively holding one or more sensors 12, 14 in one or more elevated or other positions during inspection operations, which can include doing so independently of the presence or participation of one or more users. In other words, in at least one embodiment, system 100 can be arranged for selectively moving one or more sensors 12, 14 into one or more positions and being at least temporarily fixed in a configuration for holding one or more sensors 12, 14 in any of such positions while a user inspects equipment disposed remotely from system 100 (e.g., one or more spray heads, control boxes, fluid conduits, fluid connections, or other fluid system components located beyond arm's reach from tank 10 and/or access port 16). Following such an inspection of remote equipment, system 100 can be arranged for being quickly and easily reconfigured, such as for returning one or more sensors 12, 14 to a prior position, removing system 100 from tank 10, and/or transforming one or more components of system 100 to a storage configuration. In at least one embodiment, tank 10 can be or include one or more septic tanks. In at least one embodiment, sensors 12, 14 can be or include one or more pump and/or motor sensors disposed in a septic tank.

In at least one embodiment, first pole 110 can be longer than second pole 120, and/or can be of a length sufficient for one end of pole 110 to contact the bottom of tank 10 while another end of pole 110 extends above or otherwise outside of tank 10. In at least one embodiment, first pole 110 can be suspended from second pole 120 via coupler 130, such as when the first end of pole 110 is disposed within tank 10. In at least one embodiment, first pole 110 and/or second pole 120 can be at least partially tubular, such as by way of being wholly or partially comprised of tubing, whether cylindrical or otherwise. In at least one embodiment, first pole 110 and/or second pole 120 can be of a solid cross section, in whole or in part. In at least one embodiment, first pole 110 and/or second pole 120 can be made wholly or partially of any of various materials, such as aluminum, plastic, fiberglass, carbon fiber or another material suitable for the purposes described herein (separately or in combination). In at least one embodiment, first pole 110 and/or second pole 120 can be of an adjustable length, such as by way of a telescoping configuration.

In at least one embodiment, the first end of first pole 110 can selectively couple with one or more sensors 12, 14 disposed within tank 10, such as separately or collectively. In at least one embodiment, the first end of first pole 110 can include one or more hooks 112 arranged for coupling with equipment disposed in tank 10. For example, hook 112 can be arranged for lifting one or more sensors 12, 14, such as by way of coupling with a housing of a sensor 12, 14 and/or a wire or cable coupled to a sensor 12, 14. In at least one embodiment, one or more hooks 112 can be coupled to a pole 110, 120 removably, such as via a threaded connection or other removably coupling. In at least one embodiment, one or more hooks 112 can be coupled to a pole 110, 120 permanently, such as in a manner not intended for ready removal.

In at least one embodiment, coupler 130 can be arranged for selectively coupling first pole 110 and second pole 120 to one another in one or more positions. In at least one embodiment, coupler 130 can selectively couple first pole 110 and second pole 120 to one another in a first position wherein first and second poles 110, 120 cross one another. In at least one embodiment, coupler 130 can selectively couple first pole 110 and second pole 120 to one another in a first position wherein first and second poles 110, 120 are perpendicular to one another. In at least one embodiment, coupler 130 can selectively couple first pole 110 and second pole 120 to one another in a second position wherein first and second poles 110, 120 do not cross one another. In at least one embodiment, coupler 130 can selectively couple first pole 110 and second pole 120 to one another in a second position wherein first and second poles 110, 120 are parallel to (i.e., at least substantially parallel to) one another. In at least one embodiment, coupler 130 can selectively couple first pole 110 and second pole 120 to one another in any of a plurality of angular or rotational positions relative to one another.

In at least one embodiment, second pole 120 can span access port 16 of tank 10. In at least one embodiment, the first end of first pole 110 can be disposed within tank 10 when first pole 110 and second pole 120 are coupled to one another in at least one position. In at least one embodiment, the first end of first pole 110 can support a sensor 12, 14 disposed within tank 10 when first pole 110 and second pole 120 are coupled to one another in at least one position. In at least one embodiment, second pole 120 and coupler 130 can support the first end of first pole 110 at a plurality of different locations within tank 10. In at least one embodiment, second pole 120 and coupler 130 can selectively suspend the first end of first pole 110 at a plurality of different locations within tank 10.

In at least one embodiment, coupler 130 can selectively couple second pole 120 to first pole 110 at a plurality of different locations along a length of first pole 110. In at least one embodiment, coupler 130 can selectively couple first pole 110 to second pole 120 at a plurality of different locations along a length of second pole 120. In at least one embodiment, coupler 130 can be slideably coupled to one or both of first pole 110 and second pole 120 and/or can be selectively fixed at a plurality of different locations along a length of one or both of first pole 110 and second pole 120. In at least one embodiment, first and second poles 110, 120 can be rotateably coupled to one another via coupler 130. In at least one embodiment, coupler 130 can selectively and rotateably secure one of first and second poles 110, 120 in one or more positions relative to the other of first and second poles 110, 120. In at least one embodiment, coupler 130 can selectively couple with at least one of first and second poles 110, 120 by snap fit, interference fit, friction fit, or any combination thereof. In at least one embodiment, coupler 130 can be removably coupled to one or both of first and second poles 110, 120. In at least one embodiment, coupler 130 can be permanently coupled to one or both of first and second poles 110, 120.

In at least one embodiment, coupler 130 can be slideably coupled to one or both of first and second poles 110, 120 and/or can be selectively fixed at any of a plurality of different locations along a length of one or both of first and second poles 110, 120. In at least one embodiment, coupler 130 can be slideably coupled to first pole 110 and configured to be selectively fixed at a plurality of different locations along a length of first pole 110. In at least one embodiment, coupler 130 can be slideably coupled to second pole 120 and configured to be selectively fixed at a plurality of different locations along a length of second pole 120. In at least one embodiment, first and second poles 110, 120 can be rotateably coupled to one another.

In at least one embodiment, coupler 130 can include two or more coupler portions coupled to one another. In at least one embodiment, coupler 130 can include a first portion for coupling with first pole 110 and a second portion for coupling with second pole 120. In at least one embodiment, the first and second portions of coupler 130 can be rotateably coupled to one another, such as via a fastener or other rotatable coupler. In at least one embodiment, one or both portions of coupler 130 can selectively couple with at least one of first and second poles 110, 120 by snap fit, interference fit, friction fit, or any combination thereof. In at least one embodiment, two or more portions of coupler 130 can be identical to one another (i.e., at least substantially, approximately, or about identical). In at least one embodiment, two or more portions of coupler 130 can be different from one another in one or more ways, such as by way of having different lengths, shapes, materials, inside dimensions, outside dimensions, other attributes, or any combination thereof. For example, in at least one embodiment, poles 110, 120 can have the same outside dimensions and shape, and two or more portions of coupler 130 can be arranged for selectively coupling with either of poles 110, 120. As another example, in at least one embodiment, poles 110, 120 can have different outside dimensions and/or shapes, and two or more portions of coupler 130 can be arranged for selectively coupling with only one of poles 110, 120.

In at least one embodiment, coupler 130 can be arranged for coupling poles 110, 120 in one or more operational or working configurations (see, e.g., FIGS. 1, 2, 8, 9) and one or more storage or folded configurations (see, e.g., FIGS. 5, 6). In at least one embodiment, system 100 can include a plurality of couplers 130, such as for selectively coupling poles 110, 120 and/or portions thereof in any of the aforementioned configurations.

In at least one embodiment, one or more poles 110, 120 can be or include a one-piece pole, such as by way of being made of a single piece of tubing or other pole material. In at least one embodiment, one or more poles can be or include a multi-piece pole, such as by way of being made up of a plurality of pole portions or sections (e.g., portions 110A, 110B) configured to be coupled to one another, for example, in an end to end configuration. In at least one embodiment, two or more pole portions can be removably coupled to one another via one or more couplers 140A, 140B, such as via a threaded connection, quarter-turn connection or other removable coupling. In at least one embodiment, one or more poles 110, 120 can be of a fixed length. In at least one embodiment, one or more poles 110, 120 can be of an adjustable length, such as by way of comprising two or more pole portions that telescope relative to one another. In at least one embodiment, one or more poles 110, 120 can have one or more handles or grips 150, which can be disposed on one or more ends of the pole 110, 120 and/or otherwise disposed along a length of the pole 110, 120.

In at least one embodiment, one or more poles 110, 120 can have a length greater than a length of one or more other poles. In at least one embodiment, one or more poles 110, 120 can include two or more pole portions arranged to be coupled to one another and having a collective length greater than a length of one or more other poles or pole portions. In at least one embodiment, a first or other pole 110 (such as a reaching pole) can be arranged for being disposed through an access port 16 of a tank 10, a second or other pole 120 (such as a spanning pole or support pole) can be arranged for being coupled to the reaching pole 110 and spanning the access port 16 of the tank 10, and the reaching pole 110 can be longer than the spanning pole 120. In at least one embodiment, the reaching pole 110 can be a multi-piece pole and the spanning pole 120 can be a one-piece pole. In at least one embodiment, the reaching pole 110 can be arranged for having a first portion disposed within a tank 10 and a second portion disposed outside of tank 10 during inspection operations, and the first portion can be longer than the second portion in at least one or more coupled configurations with the spanning pole 120. In at least one embodiment, the reaching pole 110 can be arranged for having a first portion disposed within a tank 10 and a second portion disposed outside of tank 10 during inspection operations, and the first portion can be shorter than the second portion in at least one or more coupled configurations with the spanning pole 120.

In at least one embodiment, a first or other pole 110 (such as a reaching pole) can be arranged for being disposed through an access port 16 of a tank 10 and lifting one or more sensors 12, 14, while also being short enough to help guard against accidental or other operation of a pump or motor under conditions that could harm such equipment. For example, because lifting one or more sensors 12, 14 may trigger or enable operation of a pump, it can be important to ensure there is adequate water or other liquid in the tank to operate the pump without harming the pump. In at least one embodiment, the reaching pole 110 can be arranged for having a first portion disposed within a tank 10 and a second portion disposed outside of tank 10 during inspection operations, and the overall length of reaching pole 110 can be shorter than a depth of the tank 10. In at least one embodiment, the reaching pole 110 can be arranged for having a first portion disposed within a tank 10 and a second portion disposed outside of tank 10 during inspection operations, and the overall length of reaching pole 110 can be long enough to couple with a sensor 12, 14 when an adequate liquid level is present within the tank 10, yet short enough to make it difficult or impossible to reach a sensor 12, 14 when an adequate liquid level is not present within the tank 10. Such dimensions can vary by tank type, as well as from one embodiment of the disclosure to another.

In at least one embodiment, such as an embodiment utilized for inspecting common septic tanks (i.e., inspecting septic systems including one or more of such tanks), a first or other pole 110 can have an overall length of at least approximately 80 inches, or from 65 inches to 95 inches, for example. In at least one embodiment, pole 110 can have such an overall length, including a hook 112 having a length of at least approximately 6 inches. In at least one embodiment, one or more hooks 112 can be longer or shorter than 6 inches. In at least one embodiment, a second or other pole 120 can have an overall length of approximately 34 inches, or from 20 inches to 48 inches, for example. In at least one embodiment, pole 110 can be a multi-piece pole and can have an overall length of at least approximately 80 inches, which can include one pole portion having a length of at least approximately 40 inches, another pole portion having a length of at least approximately 34 inches, and a hook having a length of at least approximately 6 inches.

In at least one embodiment, a method of inspecting a septic system having an underground tank with an access port can include accessing an interior of the tank through the access port, lifting a sensor within the tank to an elevated position with a first pole, spanning the access port with a second pole, suspending the first pole and the sensor from the second pole, or any combination thereof. In at least one embodiment, a method of inspecting a septic system can include coupling the first and second poles to one another. In at least one embodiment, a method of inspecting a septic system can include holding the sensor in the elevated position with the first pole. In at least one embodiment, a method of inspecting a septic system can include sliding the second pole downwardly along the first pole until the second pole contacts at least one of the access port, a structure surrounding the access port, and a combination thereof. In at least one embodiment, a method of inspecting a septic system can include selectively and/or independently holding the sensor in the elevated position with the first and second poles. In at least one embodiment, a method of inspecting a septic system can include sliding the first pole downwardly relative to the second pole to release the sensor.

In at least one embodiment, the system can include a pump and one or more spray heads. In at least one embodiment, the method can include running the pump and inspecting the one or more spray heads while the first pole and the sensor are suspended from the second pole. In at least one embodiment, the sensor can be a pump sensor. In at least one embodiment, the system can include an alarm sensor disposed within the tank. In at least one embodiment, the method can include lifting the alarm sensor with the first pole. In at least one embodiment, lifting the alarm sensor with the first pole can occur before, during, or after suspending the first pole and the pump sensor from the second pole.

In at least one embodiment, the second pole can be selectively coupled to the first pole in a first position when the first pole and the sensor are suspended from the second pole. In at least one embodiment, the method can include coupling the second pole to the first pole in a second position that differs from the first position. In at least one embodiment, the method can include lifting the sensor and/or one or more other sensors with the first pole while the second pole is coupled to the first pole in the second position.

In at least one embodiment, the method can include independently holding the sensor in the elevated position with the first and second poles. In at least one embodiment, the method can include inspecting a portion of the system located distally from the access port while the sensor is held in the elevated position with the first and second poles. In at least one embodiment, the elevated position can be within the tank.

In at least one embodiment, the method can include coupling the first and second poles to one another with a coupler. In at least one embodiment, the method can include coupling the first and second poles to one another in a plurality of different positions with a single coupler In at least one embodiment, a system for inspecting an underground tank can include a first pole having a first end for being disposed through an access port of the tank and a second end longitudinally opposite the first end, a second pole having a first end and a second end longitudinally opposite the first end, a coupler for selectively coupling the first pole and the second pole to one another in at least one position, or any combination thereof. In at least one embodiment, the second pole can span the access port of the tank, the first end of the first pole can lift a sensor disposed within the tank to an elevated position, the first pole, the second pole and the coupler can selectively and/or independently hold the sensor in the elevated position, or any combination thereof. In at least one embodiment, the tank can be a septic tank. In at least one embodiment, the sensor can be a pump sensor in a septic tank.

In at least one embodiment, the first pole can be longer than the second pole. In at least one embodiment, the first pole can be suspended from the second pole. In at least one embodiment, the first end of the first pole can selectively couple with a sensor disposed within the tank. In at least one embodiment, the first end of the first pole can include a hook.

In at least one embodiment, the coupler can selectively couple the first pole and the second pole to one another in a first position wherein the first and second poles cross one another. In at least one embodiment, the coupler can selectively couple the first pole and the second pole to one another in a first position wherein the first and second poles are perpendicular to one another. In at least one embodiment, the coupler can selectively couple the first pole and the second pole to one another in a second position wherein the first and second poles do not cross one another. In at least one embodiment, the coupler can selectively couple the first pole and the second pole to one another in a second position wherein the first and second poles are parallel to one another.

In at least one embodiment, the second pole can span the access port of the tank. In at least one embodiment, the first end of the first pole can be disposed within the tank when the first pole and the second pole are coupled to one another in the at least one position. In at least one embodiment, the first end of the first pole can support a sensor disposed within the tank when the first pole and the second pole are coupled to one another in the at least one position. In at least one embodiment, the second pole and the coupler can support the first end of the first pole at a plurality of different locations within the tank. In at least one embodiment, the second pole and the coupler can selectively suspend the first end of the first pole at a plurality of different locations within the tank.

In at least one embodiment, the coupler can selectively couple the second pole to the first pole at a plurality of different locations along a length of the first pole. In at least one embodiment, the coupler can be slideably coupled to the first pole and/or can be selectively fixed at a plurality of different locations along a length of the first pole. In at least one embodiment, the first and second poles can be rotateably coupled to one another. In at least one embodiment, the coupler can selectively rotateably secure one of the first and second poles in one or more positions relative to the other of the first and second poles. In at least one embodiment, the coupler can selectively couple with at least one of the first and second poles by snap fit.

In at least one embodiment, the coupler can be slideably coupled to the first pole and/or can be selectively fixed at a plurality of different locations along a length of the first pole. In at least one embodiment, the coupler can be slideably coupled to the second pole and configured to be selectively fixed at a plurality of different locations along a length of the second pole. In at least one embodiment, the first and second poles can be rotateably coupled to one another. In at least one embodiment, the coupler can include a first portion coupled to the first pole and a second portion coupled to the second pole. In at least one embodiment, the first and second portions of the coupler are rotateably coupled to one another.

In at least one embodiment, a method of inspecting a septic system having an underground tank with an access port can include accessing an interior of the tank through the access port, lifting a sensor within the tank to an elevated position with a first pole, spanning the access port with a second pole, suspending the first pole and the sensor from the second pole, or any combination thereof. In at least one embodiment, a method of inspecting a septic system can include coupling the first and second poles to one another. In at least one embodiment, a method of inspecting a septic system can include holding the sensor in the elevated position with the first pole. In at least one embodiment, a method of inspecting a septic system can include sliding the second pole downwardly along the first pole until the second pole contacts at least one of the access port, a structure surrounding the access port, and a combination thereof. In at least one embodiment, a method of inspecting a septic system can include selectively and/or independently holding the sensor in the elevated position with the first and second poles. In at least one embodiment, a method of inspecting a septic system can include sliding the first pole downwardly relative to the second pole to release the sensor.

In at least one embodiment, the system can include a pump and one or more spray heads. In at least one embodiment, the method can include running the pump and inspecting the one or more spray heads while the first pole and the sensor are suspended from the second pole. In at least one embodiment, the sensor can be a pump sensor. In at least one embodiment, the system can include an alarm sensor disposed within the tank. In at least one embodiment, the method can include lifting the alarm sensor with the first pole. In at least one embodiment, lifting the alarm sensor with the first pole can occur before, during, or after suspending the first pole and the pump sensor from the second pole.

In at least one embodiment, the second pole can be selectively coupled to the first pole in a first position when the first pole and the sensor are suspended from the second pole. In at least one embodiment, the method can include coupling the second pole to the first pole in a second position that differs from the first position. In at least one embodiment, the method can include lifting the sensor and/or one or more other sensors with the first pole while the second pole is coupled to the first pole in the second position.

In at least one embodiment, the method can include independently holding the sensor in the elevated position with the first and second poles. In at least one embodiment, the method can include inspecting a portion of the system located distally from the access port while the sensor is held in the elevated position with the first and second poles. In at least one embodiment, the elevated position can be within the tank.

In at least one embodiment, the method can include coupling the first and second poles to one another with a coupler. In at least one embodiment, the method can include coupling the first and second poles to one another in a plurality of different positions with a single coupler.

In at least one embodiment, one or more poles can be or include a one-piece pole, such as by way of being made of a single piece of tubing or other pole material. In at least one embodiment, one or more poles can be or include a multi-piece pole, such as by way of being made up of a plurality of pole portions or sections configured to be coupled to one another, for example, in an end to end configuration. In at least one embodiment, two or more pole portions can be removably coupled to one another, such as via a threaded connection, quarter-turn connection or other removable coupling. In at least one embodiment, one or more poles can be of a fixed length. In at least one embodiment, one or more poles can be of an adjustable length, such as by way of comprising two or more pole portions that telescope relative to one another. In at least one embodiment, one or more poles can have one or more handles or grips, which can be disposed on one or more ends of the pole and/or otherwise disposed along a length of the pole.

In at least one embodiment, one or more poles can have a length greater than a length of one or more other poles. In at least one embodiment, one or more poles can include two or more pole portions arranged to be coupled to one another and having a collective length greater than a length of one or more other poles or pole portions. In at least one embodiment, a first or other pole (such as a reaching pole) can be arranged for being disposed through an access port of a tank, a second or other pole (such as a spanning pole or support pole) can be arranged for being coupled to the reaching pole and spanning the access port of the tank, and the reaching pole can be longer than the spanning pole. In at least one embodiment, the reaching pole can be a multi-piece pole and the spanning pole can be a one-piece pole.

Other and further embodiments utilizing one or more aspects of the disclosure can be devised without departing from the spirit of Applicant's disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicant, but rather, in conformity with the patent laws, Applicant intends to fully protect all such modifications and improvements that come within the scope or range of equivalents of the following claims.

What is claimed is:

1. A system for inspecting an underground tank, the system comprising:
   a first pole having a first end configured to be disposed through an access port of the tank and a second end longitudinally opposite the first end;
   a second pole having a first end and a second end longitudinally opposite the first end; and
   a coupler;
   wherein the coupler is configured to selectively couple the first pole and the second pole to one another in at least one position.

2. The system of claim 1, wherein the first pole is longer than the second pole.

3. The system of claim 1, wherein the at least one position comprises a first position wherein the first and second poles cross one another.

4. The system of claim 3, wherein the at least one position further comprises a second position wherein the first and second poles do not cross one another.

5. The system of claim 1, wherein the at least one position comprises a first position wherein the first and second poles are perpendicular to one another.

6. The system of claim 5, wherein the at least one position further comprises a second position wherein the first and second poles are parallel to one another.

7. The system of claim 1, wherein the coupler is configured to selectively suspend the first pole from the second pole.

8. The system of claim 7, wherein the coupler is configured to selectively suspend the first pole from the second pole in a plurality of positions when the first end of the first pole is disposed within the tank and the second end of the first pole is disposed outside of the tank.

9. The system of claim 1, wherein the first end of the first pole comprises a hook.

10. The system of claim 1, wherein the first end of the first pole is configured to lift a sensor disposed within a septic tank.

11. The system of claim 1, wherein the second pole is configured to span the access port of the tank, and wherein the first end of the first pole is configured to be disposed within the tank when the first pole and the second pole are coupled to one another in the at least one position.

12. The system of claim 11, wherein the second pole and the coupler are configured to support the first end of the first pole at a plurality of different locations within the tank and above a floor of the tank.

13. The system of claim 11, wherein the first end of the first pole is configured to support a sensor disposed within the tank when the first pole and the second pole are coupled to one another in the at least one position.

14. The system of claim 11, wherein the second pole and the coupler are configured to selectively suspend the first end of the first pole at a plurality of different locations within the tank.

15. The system of claim 1, wherein the coupler is configured to selectively couple the second pole to the first pole at a plurality of different locations along a length of the first pole.

16. The system of claim 1, wherein the coupler is configured to selectively couple with at least one of the first and second poles by snap fit.

17. The system of claim 1, wherein the first and second poles are rotateably coupled to one another, and wherein the coupler is configured to selectively secure one of the first and second poles in one or more positions relative to the other of the first and second poles.

18. The system of claim 1, wherein the coupler is slideably coupled to the first pole and configured to be selectively fixed at a plurality of different locations along a length of the first pole.

19. The system of claim 1, wherein the second pole is configured to span the access port of the tank, wherein the first end of the first pole is configured to lift a sensor disposed within the tank to an elevated position, and wherein the first pole, the second pole and the coupler are collectively configured to selectively hold the sensor in the elevated position.

20. The system of claim 19, wherein the coupler comprises a first coupler portion slideably coupled to the first pole and configured to be selectively fixed at a plurality of different locations along a length of the first pole; wherein the coupler comprises a second coupler portion slideably coupled to the second pole and configured to be selectively fixed at a plurality of different locations along a length of the second pole; wherein the first and second coupler portions are rotateably coupled to one another; and wherein the coupler is configured to selectively suspend the first pole from the second pole while the sensor is held in the elevated position.

* * * * *